United States Patent

Okigami et al.

[11] Patent Number: 5,749,307
[45] Date of Patent: May 12, 1998

[54] REFUSE INCINERATION FACILITY INCLUDING MATERIAL CRUSHER AND MELT BURNER

[75] Inventors: Noboru Okigami; Yoshitoshi Sekiguchi; Kunio Sasaki; Hideo Shimotani; Masaharu Terashima, all of Osaka, Japan

[73] Assignee: Hitachi Zosen Corporation, Osaka, Japan

[21] Appl. No.: 776,636

[22] PCT Filed: Jul. 8, 1996

[86] PCT No.: PCT/JP96/01897

§ 371 Date: Jan. 24, 1997

§ 102(e) Date: Jan. 24, 1997

[87] PCT Pub. No.: WO97/03320

PCT Pub. Date: Jan. 30, 1997

[30] Foreign Application Priority Data

Jul. 10, 1995 [JP] Japan .................................. 7-172641

[51] Int. Cl.⁶ .................................................. F23G 5/02
[52] U.S. Cl. ................... 110/222; 110/235; 110/257; 110/259; 110/248
[58] Field of Search ............................. 110/220, 222, 110/257, 259, 248, 102, 232, 235, 104 B

[56] References Cited

U.S. PATENT DOCUMENTS

| | | | |
|---|---|---|---|
| 4,878,440 | 11/1989 | Tratz et al. | 110/259 X |
| 5,154,128 | 10/1992 | Scholl et al. | 110/222 X |
| 5,320,050 | 6/1994 | Ishida et al. | 110/259 X |
| 5,372,077 | 12/1994 | Yen et al. | 110/235 X |
| 5,632,211 | 5/1997 | Okuno et al. | 110/235 |

FOREIGN PATENT DOCUMENTS

| | | |
|---|---|---|
| 55-140026 | 11/1980 | Japan . |
| 61-250417 | 11/1986 | Japan . |
| 61-262513 | 11/1986 | Japan . |
| 5126328 | 5/1993 | Japan . |

*Primary Examiner*—Henry A. Bennett
*Assistant Examiner*—Susanne C. Tinker
*Attorney, Agent, or Firm*—Barnes, Kisselle, Raisch, Choate, Whittemore & Hulbert P.C.

[57] ABSTRACT

There are provided a pretreatment facility (1) and a incineration/melting facility (2). In the incineration/melting facility, an incineration chamber (3) and a melting chamber (5) are integrally formed through a partition wall (7) so that incineration residue can be continuously transferred. Fine crushed material finely crushed by the pretreatment facility (1) is supplied as fuel to a burner (4). This enables it to obtain melting heat source from waste, and to efficiently treat the waste at a low cost by directly superheating and melting non-cooled incineration residue from the incineration chamber (3).

5 Claims, 1 Drawing Sheet

REFUSE INCINERATION FACILITY INCLUDING MATERIAL CRUSHER AND MELT BURNER

FIELD OF THE INVENTION

The present invention relates to a refuse incineration facility for continuously performing incineration of refuse and melting of incineration residue.

BACKGROUND OF THE INVENTION

A vertical moving bed furnace has been conventionally known as an incinerator which can continuously perform incineration of refuse and melting of incineration residue such as incineration ash produced from incineration. It feeds waste from the top, supplies oxidant (air or oxygen enriched air) into the bottom, and burns waste at the lower part of the fluidized bed and melt residue with heat of its combustion.

However, in the vertical moving bed furnace, since the waste and the oxidant constitute counterflow, and pyrolysis gas generated from the waste flows out upward together with exhaust gas, temperature is low in a melting chamber at the bottom of furnace, so that the residue cannot be burnt only with heat value generated from burning of the waste. Thus, coke is fed as pilot fuel to provide ventilation effect as well to melt residue with heat obtained from the coke. Therefore, coke which is valuable resource is used, so that there is a problem that the disposal cost is increased.

DISCLOSURE OF THE INVENTION

The present invention is intended to provide a refuse incineration facility which can dispose waste at a high efficiency, and reduce incineration cost.

To attain the object, the refuse incineration facility of the present invention comprises a pretreatment facility for pretreating waste, and an incineration/melting facility for heating and incinerating the waste treated by the pretreatment facility, and then for continuously melting its residue: said pretreatment facility comprising a coarse crusher for crushing the waste; a coarse crushed material classifier for classifying light crushed material mainly consisting of combustible and heavy crushed material containing much noncombustible from the coarse crushed material crushed by the coarse crusher; a recyclable separator for separating and removing recyclable metals from the heavy crushed material; and a fine crusher for further crushing light crushed material discharged from the coarse crushed material classifier; said incineration/melting facility comprising an incineration chamber for heating and incinerating the material to be incinerated; a melting chamber formed integrally with the incineration chamber, being capable of continuously transferring incineration residue generated in the incineration chamber from the incineration chamber, and having a burner; fuel supply means for introducing part or all of the fine crushed material crushed by the fine crusher into the burner in the melting chamber; and crushed material supply means for introducing the heavy crushed material separated by the recyclable separator and remaining fine crushed material crushed by the fine crusher into the incineration chamber.

In the pretreatment facility with the above arrangement, after the waste is coarsely crushed by the coarse crusher, the coarse crushed material is fed to coarse crushed material separator and the recyclable separator, and separated into light crushed material mainly consisting of combustible and the heavy crushed material containing much noncombustible by the coarse crushed material separator. Then, the heavy crushed material is fed to the recyclable separator where recyclable metals are separated and removed. Thereafter, heavy separated waste is fed to the incineration chamber of the incineration/melting facility through the crushed material supply means. In addition, light crushed material is fed to the fine crusher where it is further crushed. Part or all of it is fed to the burner in the melting chamber through the fuel supply means, and the remainder is fed to the incineration chamber through the crushed material supply means for burning and incineration. Then, in the incineration chamber, the heavy crushed material and the remaining fine crushed material are heated and burnt, and the incineration residue is continuously fed from the incineration chamber to the melting chamber. Then, in the melting chamber, it is heated and melted by the burner which uses part or all of the fine crushed material as fuel, reduced for volume and rendered harmless.

With the above arrangement, since waste pretreated and finely crushed is used as fuel for the burner, operating cost can be significantly reduced. In addition, since the incineration chamber is constructed integral with the melting chamber so that the incineration residue can be continuously transferred from the former to the latter, the incineration residue is not once cooled and then heated again as in a separate type, so that loss of heat is reduced and operation can be efficiently performed. Furthermore, since the incineration chamber is integrally constructed with the melting chamber, the entire facility can be made compact.

In addition to the above arrangement, a classifier for material to be incinerated is provided at the discharge side of the fine crusher. While the fuel supply means is provided at the discharge side of the fine grain crushed material of the classifier, the crushed material supply means is provided at the discharge side of coarse grain crushed material. The classifier enables it to stably feed only classified fine grain crushed material to the burner as fuel, so that the burner can effect stable combustion.

Still further, in addition to the above arrangement, an oxygen enriched air supply unit is provided for supplying oxygen enriched air as combustion air for the burner. Using oxygen enriched air as combustion air for the burner, it becomes possible to perform suspended combustion of crushed material with low heat value and crushed material with relatively large crushed area, so that it can be contemplated to perform combustion at a higher temperature, to stabilize flame, and to improve combustion rate.

Still further, in addition to the above arrangement, a fire grate of the incineration chamber and the hearth of the melting chamber the incineration/melting facility are downward inclined and caused to continue to the downstream. This enables it to transfer the incineration residue to the melting chamber without lowering its temperature, and to preheat incineration residue by utilizing the gas for the burner, so that combustion and melting can be efficiently performed.

DESCRIPTION OF THE EMBODIMENTS

Figure 1:
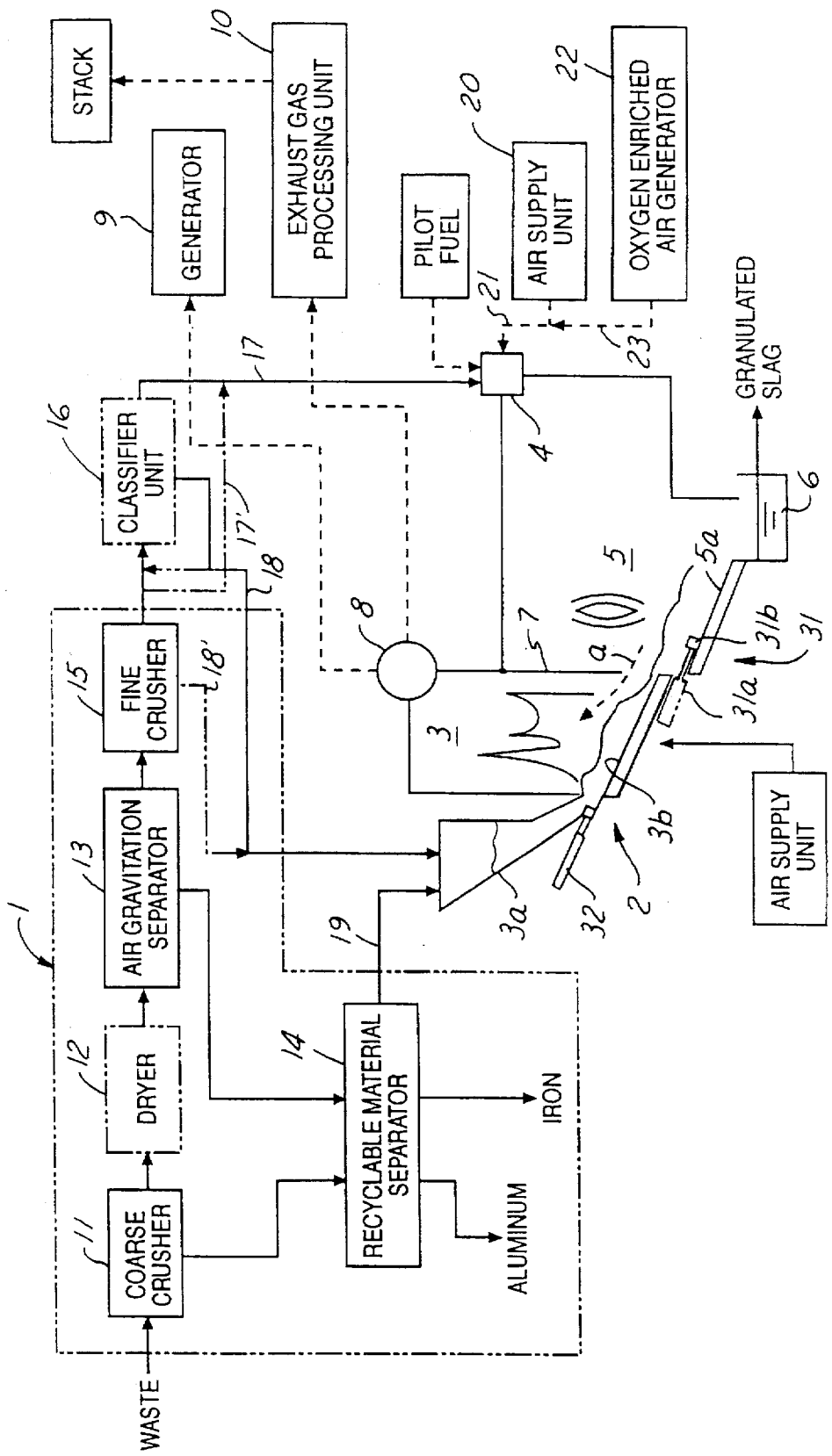
FIG. 1 is a block diagram of the refuse incineration facility according to an embodiment of the present invention.

Referring to FIG. 1, there are provided a pretreatment facility 1 for pretreating waste, and an incineration/melting facility 2 for heating and incinerating the waste treated by the pretreatment facility 1 and then continuously melting and processing its residue.

The incineration/melting facility 2 is integrally provided with an incineration chamber 3 for combusting the crushed material fed from a hopper 3a on a fire grate 3b, and a melting chamber 5 for heating and melting incineration residue discharged from the incineration chamber 3 with a fluff burner 4 which is an example of a burner. Then, molten slag melted in the melting chamber 5 is fed into a slag cooling chamber 6 to produce granulated slag. In addition, the incineration chamber 3 and the melting chamber 5 are partitioned at their upper sections with one partition wall 7. Then, disposed on the lower section of the partition wall 7 are the fire grate 3b of the incineration chamber 3 downward inclined from the upstream to the downstream and the hearth 5a of the melting chamber 5 so that the incineration chamber 3 communicates with the melting chamber 5. The fire grate 3b of the incineration chamber 3 is constituted to be movable by alternately arranging in the lateral direction a row of fixed fire grates and a row of movable fire grates reciprocated in the feeding direction. In addition, provided on the lower section of the hopper 3a is a crushed material pusher unit 32 for supplying the crushed material fed through the hopper 3a onto the fire grate 3b. Therefore, the incineration residue generated in the incineration chamber 3 is directly and continuously supplied to the melting chamber 5 without lowering temperature by utilizing feeding force of the fire grate 3b and the crushed material pusher unit 32, and the gravity.

In a case where it is difficult to continuously transfer the incineration residue to the melting chamber 5 by the feeding force of the fire grate 3b and the crushed material pusher unit 32, and the gravity, as shown by phantom lines, an incineration residue forced pusher unit 31 is provided at a step formed between the fire grate 3b and the hearth 5a of the melting chamber 5, the pusher unit 31 comprising an air cylinder 31a, and a pusher block 31b extended and retracted by the air cylinder 31a.

Combustion gas a at a high temperature generated by the melting powder burner 4 to heat the incineration residue, is fed to the incineration chamber 3 side to preheat the incineration residue being transferred, and then discharged together with exhaust gas from the incineration chamber 3, and, at that time, heat is recovered by a boiler heat exchanger 8.

The pretreatment facility 1 comprises a coarse crusher 11 for coarse crushing waste to about 50–80 mm square, a dryer 12 (disposed as required) for the coarse crushed material crushed by the coarse crusher 11, an air gravitation separator 13 which is an example of a coarse crushed material separator for separating the coarse crushed material with wind force into light crushed material mainly consisting of combustible and heavy crushed material containing much non-combustible, a recyclable material separator 14 for separating and removing recyclable metals such as aluminum and iron by utilizing a magnet or specific gravity, a fine crusher 15 for further finely crushing the light crushed material discharged from the air gravitation separator 13, and a classifier unit 16 (disposed as required) for classifying the fine crushed material crushed by the fine crusher 15 into fine grain crushed material (fluff fuel) with size of 5 mm square or less which can be used as fuel for the fluff burner 4 and coarse grain crushed material with size exceeding it.

Then, a fuel supply pipe (fuel supply means) 17 for pneumatically transporting the fine grain crushed material to the fluff burner 4 as fuel is connected to the fine grain crushed material discharge side of the classifier 16, while a coarse grain crushed material supply pipe (crushed material supply means) 18 for pneumatically transporting waste into the hopper 3a of the incineration chamber 3 is connected to the coarse grain crushed material discharge side. The coarse grain crushed material supply pipe 18 is provided with a circulating pipe for returning the coarse grain crushed material to the classifier 16, as required.

It may be possible to directly supply the fine crushed material crushed by the fine crusher 15 to the fluff burner 4 through a fuel supply pipe 17', or to directly supply it from the fine crusher 15 to the hopper 3a of the incineration chamber 3 through the coarse grain crushed material supply pipe 18.

In addition, in a case where the fine crusher 15 has a capability of crushing most of the fine crushed material crushed by it to fine grain crushed material (fluff fuel) with size of 5 mm square or less which can be used as fuel for the fluff burner 4, all fine crushed material may be supplied to the fluff burner 4 through the supply pipe 17'.

The fluff burner 4 is connected with a combustion air pipe 21 for supplying combustion air from an air supply unit 20. In addition, the combustion air pipe 21 is connected with an enriched air pipe 23, so that oxygen enriched air of which oxygen concentration is enhanced by about 30% can be supplied from an enriched air pipe 23 to the fluff burner 4 through the combustion air pipe 21 by an oxygen enriched air generator 22.

With the above arrangement, collected waste is first fed to the pretreatment facility 1, and primarily crushed to size of about 50–80 mm square by the coarse crusher 11. Then, it is transferred to the air gravitation separator 13 after dried by the dryer 12 or without dried, where the coarse crushed material is separated into heavy crushed material and light crushed material. The heavy crushed material separated here or that directly fed from the coarse crusher 11 is transferred to the recyclable waste separator 14 where recyclable metals are separated and removed. Thereafter, it is fed to the hopper 3a of the incineration chamber 3 through a heavy crushed material supply line (crushed material supply means) 19.

The light crushed material separated by the air gravitation separator 13 is fed to the fine crusher 15 for secondary crushing so that it is further finely crushed. Then, the fine crushed material is classified by the classifier 16, and fine grain crushed material (fluff) of 5 mm square or less is fed to the fluff burner 4 through the fuel supply pipe 17. In addition, coarse grain crushed material larger than 5 mm square is transferred to the hopper 3a through the coarse grain crushed material supply pipe 18, and fed into the incineration chamber 3.

If no classifier 16 is provided, the fine crushed material is divided into predetermined volume, required volume is supplied to the fuel supply pipe 17', and remaining volume is supplied to a coarse grain crushed material supply pipe 18'.

In addition, if most of the fine crushed material is fine grain crushed material (fluff) of size of 5 mm square or less, all of the fine crushed material may be transferred from the fuel supply pipe 17' to the fluff burner 4.

The crushed material fed to the incineration chamber 3 through the hopper 3a is heated, burnt and incinerated to produce incineration residue. The incineration residue is directly fed from the fire grate 3b to the hearth 5a of the melting chamber 5 by the feeding force of the fire grate 3b and the crushed material pusher unit 32 and the gravity. Then, it is heated and melted by the fluff burner 4. Then, molten slag is fed into the slag cooling chamber 6 for water cooling to produce granulated slag. In this case, the combustion gas a in the melting chamber 5 is fed from the hearth 5a to the fire grate 3b to preheat the incineration residue before discharged together with exhaust gas from the incineration chamber 3, and heat is recovered by the boiler heat exchanger 8. Steam obtained from the boiler heat exchanger 8 is introduced into a steam turbine in a generator 9 for electric power generation. In addition, the exhaust gas is discharged through an exhaust gas processing unit 10.

Then, the fluff burner 4 is supplied with pilot fuel such as LPG or heavy oil which is combusted at start-up or when quantity of heat from the fluff fuel is insufficient, and with the fine grain crushed material (fluff) of 5 mm square or less from the fuel supply pipe 17 and combustion air from the combustion air supply pipe 21 for combustion. In addition, if it is necessary, enriched air is supplied from the oxygen enriched air generator 22 to the fluff burner 4. Using enriched air for combustion of which oxygen concentration is enhanced to about 30% enables it to combust fine crushed material of about 5 mm square while conventionally only those of 1 mm square or less can be used as fluff fuel for the fluff burner. This also enables it to perform combustion at a high temperature, to stabilize flame, and to improve combustion efficiency. Furthermore, use of the enriched air for combustion enables it to reduce amount of exhaust gas by about 30%, so that it is possible to improve heat efficiency, and to reduce the size of exhaust gas treatment facility.

With the above embodiment, since fine grain crushed material (fluff) which is waste finely crushed by the coarse crusher 11 and the fine crusher 15 is used as fuel for the fluff burner 4, the operating cost can be significantly saved. In addition, since the fire grate 3b of the combustion chamber 3 and the hearth 5a of the melting chamber 5 are arranged to be continuous, and downward inclined, incineration residue is continuously transferred by feeding force of the incineration chamber 3 and its own weight. Accordingly, since it is not necessary to heat the incineration residue again after it is cooled as in the separate type, heat energy is less lost, so that operation can be performed at a high efficiency. In addition, since the incineration chamber 3 and the melting chamber 5 are integrally constituted with the partition wall 7 separating them, the entire facility can be made compact.

In addition, since only fine grain crushed material which is fine crushed material crushed by the fine crusher 15 classified by the classifier 16 is used as fuel for the fluff burner 4, more stable combustion can be performed.

Furthermore, use of oxygen enriched air as combustion air for the fluff burner 4 enables it to perform suspended combustion of crushed material with low heat value and those with relatively large crushed area, so that combustion at higher temperature, stabilization of flame, and improvement of combustion efficiency can be attained.

Although the above embodiment has been described for a refuse incineration facility which heats and incinerates waste before its residue is "continuously" melted and treated, the term "continuous" includes a functional operation of direct feeding from the fire grate 3b to the hearth 5a, but also includes a temporal and modal operation where, instead of heating residue which is once cooled as in the prior art, residue is fed in a state with high temperature for further heating.

We claim:

1. A refuse incineration facility comprising a pretreatment facility (1) for pretreating waste, and an incineration/melting facility (2) for heating and incinerating the waste treated by the pretreatment facility, and then for continuously melting its residue, said pretreatment facility (1) comprising:
   a coarse crusher (11) for crushing the waste;
   a coarse crushed material classifier (13) for classifying light crushed material mainly consisting of combustible and heavy crushed material containing much noncombustible from the coarse crushed material crushed by the coarse crusher;
   a recyclable separator (14) for separating and removing recyclable metals from the heavy crushed material; and
   a fine crusher (15) for further crushing light crushed material discharged from the coarse crushed material classifier;

said incineration/melting facility (2) comprising:
   an incineration chamber (3) for heating and incinerating the material to be incinerated;
   a melting chamber (5) formed integrally with the incineration chamber (3), being capable of continuously transferring incineration residue generated in the incineration chamber from the incineration chamber, and having a burner (4);
   fuel supply means (17) for introducing at least a portion of the fine crushed material crushed by the fine crusher into the burner (4) in said melting chamber; and
   crushed material supply means (18, 18', 19) for introducing the heavy crushed material separated by the recyclable separator (14) and any remaining fine crushed material crushed by the fine crushed (15) into the incineration chamber (3).

2. The refuse incineration facility as set forth in claim 1, wherein a classifier (16) for material to be incinerated is provided at the discharge side of the fine crusher;
   said classifier (16) being connected to the fuel supply means (17) at the discharge side of fine grain crushed material, and
   connected to the crushed material supply means (18) at the discharge side of coarse grain crushed material.

3. The refuse incineration facility as set forth in claim 1 further comprising
   oxygen enriched air supply unit (22, 23) for supplying oxygen enriched air as combustion air for the burner (4).

4. The refuse incineration facility as set forth in claim 2 further comprising
   oxygen enriched air supply unit (22, 23) for supplying oxygen enriched air as combustion air for the burner (4).

5. The refuse incineration facility as set forth in any of claims 1 through 4, wherein
   the fire grate (3b) of the incineration chamber (3) the hearth (5a) of the melting chamber (5) are continued the downstream with downward inclination in the incineration/melting facility (2).

\* \* \* \* \*